(12) United States Patent
Wu et al.

(10) Patent No.: US 8,842,692 B2
(45) Date of Patent: Sep. 23, 2014

(54) METHODS AND APPARATUS FOR ENABLING MULTIPLE DEVICES TO SHARE A DATA TRANSMISSION PERIOD

(75) Inventors: Xinzhou Wu, Monmouth Junction, NJ (US); Sanjay Shakkottai, Austin, TX (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 13/226,215

(22) Filed: Sep. 6, 2011

(65) Prior Publication Data

US 2013/0058218 A1 Mar. 7, 2013

(51) Int. Cl.
*H04L 12/413* (2006.01)
*H04W 74/08* (2009.01)

(52) U.S. Cl.
CPC .................... *H04W 74/0816* (2013.01)
USPC ............ 370/445; 370/229; 370/230; 370/231; 370/236; 370/237; 370/238; 370/236.2; 370/248; 370/329

(58) Field of Classification Search
CPC .... H04L 12/413; H04W 72/04; H04W 88/08; H04W 76/00; H04W 74/08
USPC .......... 370/229, 230–231, 242, 236, 237–238, 370/236.2, 248, 455, 329
See application file for complete search history.

(56) References Cited

U.S. PATENT DOCUMENTS

| | | | |
|---|---|---|---|
| 4,628,311 A * | 12/1986 | Milling | 370/447 |
| 5,732,077 A | 3/1998 | Whitehead | |
| 6,295,285 B1 * | 9/2001 | Whitehead | 370/329 |
| 6,967,944 B2 | 11/2005 | Choi | |
| 7,609,670 B2 | 10/2009 | Strutt et al. | |
| 7,715,426 B2 * | 5/2010 | Sakoda | 370/447 |
| 7,756,055 B2 | 7/2010 | Hulbert | |
| 2006/0221999 A1 | 10/2006 | Bachrach et al. | |
| 2007/0201412 A1 | 8/2007 | Ji et al. | |
| 2007/0242639 A1 | 10/2007 | Leonidov et al. | |
| 2008/0008147 A1 | 1/2008 | Nakayama | |
| 2008/0144493 A1 * | 6/2008 | Yeh | 370/230 |
| 2009/0286481 A1 | 11/2009 | Abraham et al. | |

(Continued)

FOREIGN PATENT DOCUMENTS

| | | |
|---|---|---|
| EP | 1662708 A1 | 5/2006 |
| JP | 9172405 A | 6/1997 |
| JP | 2008017325 A | 1/2008 |
| WO | WO2007051140 | 5/2007 |

OTHER PUBLICATIONS

Bharghavan, et al., "MACAW: A Media Access Protocol for Wireless LANs" Computer Communication Review, ACM, New York, NY, US, vol. 24, No. 4, Oct. 1, 1994, pp. 212-225, XP000477053.
Kim et al., "Spatial Reuse DCF for Enhancing Throughput and Performance Analysis," Sch. of Eng., Inf. & Commun. Univ., Daejeon, IEEE 68th Vehicular Technology.

(Continued)

*Primary Examiner* — Ricky Ngo
*Assistant Examiner* — Lan Huong Truong
(74) *Attorney, Agent, or Firm* — James K. O'Hare

(57) ABSTRACT

Various embodiments are directed to changes in protocols, e.g., an enhanced 802.11 based protocol, that enables SIR based yielding and/or improves spatial reuse in networks, e.g., 802.11 based networks. Various methods and apparatus enable multiple devices using an 802.11 based protocol to communicate, e.g., transmit, during the same time interval. In various embodiments, the methods and apparatus use transmission timing constraints and/or Signal Interference Ratio (SIR) based yielding to avoid excessive interference between devices within communication range of each other.

20 Claims, 9 Drawing Sheets

FIRST EXEMPLARY NEW PROTOCOL TO ENABLE SIR BASED YIELDING

(56) References Cited

U.S. PATENT DOCUMENTS

| | | |
|---|---|---|
| 2010/0080173 A1 | 4/2010 | Takagi |
| 2011/0003280 A1 | 1/2011 | Takahama et al. |
| 2011/0038358 A1 | 2/2011 | Wang et al. |
| 2011/0116401 A1* | 5/2011 | Banerjea et al. ............ 370/252 |
| 2011/0194542 A1* | 8/2011 | Kim et al. ................... 370/338 |
| 2011/0194644 A1* | 8/2011 | Liu et al. ..................... 375/295 |
| 2011/0222408 A1* | 9/2011 | Kasslin et al. ............... 370/241 |
| 2012/0014361 A1* | 1/2012 | Jung et al. ................... 370/338 |
| 2012/0320856 A1* | 12/2012 | Kim et al. ................... 370/329 |

OTHER PUBLICATIONS

Conference, 2008. VTC 2008—Fall, Sep. 21-24, 2008, p. 1-5.

International Search Report and Written Opinion—PCT/US2012/053974—ISA/EPO—Nov. 12, 2012.

Kim S., et al., "Design and theoretical analysis of throughput enhanced spatial reuse distributed coordination function for IEEE 802.11", IET Communications,, vol. 3, No. 12, Dec. 7, 2009, pp. 1934-1947, XP006034301, ISSN: 1751-8636, DOI: 10.1049/IET-COM:20080498 paragraphs [001.], [02.1], [02.3].

* cited by examiner

| FIGURE 5A | FIGURE 5B |

FIRST EXEMPLARY NEW PROTOCOL TO ENABLE SIR BASED YIELDING

SECOND EXEMPLARY NEW PROTOCOL TO ENABLE SIR BASED YIELDING

METHODS AND APPARATUS FOR ENABLING MULTIPLE DEVICES TO SHARE A DATA TRANSMISSION PERIOD

FIELD

Various embodiments are directed to wireless communications, and more particularly, to enabling multiple devices using a communications protocol, e.g., an 802.11 based protocol, to communicate, e.g., transmit, during the same time interval.

BACKGROUND

The Carrier Sense Multiple Access/Request to Send—Clear to Send (CSMA/RTS-CTS) protocol used in 802.11 will now be summarized. Drawing 100 of FIG. 1 shows a typical time line of events under the CSMA/RTS-CTS protocol when two links compete for medium access. In this example node A 102 and node C 106 are the two transmitters with intended receivers being node B 104 and node D 108, respectively. Various elements in this 802.11 protocol are described in the example below.

1. Each of the nodes (102, 104, 106, 108) waits for a determined time interval, Distributed Coordinated Function (DSC) Interframe Spacing (DIFS) 110 to sense ongoing transmissions.
2. After DIFS 110 is completed, each of the nodes (102, 104, 106, 108) picks a random collision window (CW). A node is not allowed to send out an RTS signal during its CW window. During CW, the node keeps carrier sensing and a node is allowed to send out an RTS subsequent to its CW window if the energy level sensed during its CW is below a predetermined threshold. In this example, consider that both node A 102 and node C 106 would like to send out RTS signals; however, consider that node A's CW is shorter than node C's CW. Therefore when the node A CW 112 ends, node A 102 generates and sends out a RTS 114. At this time node C 106 is still sensing in its CW and detects energy above a predetermined sense level, and is precluded from transmitting an RTS.
3. After receiving RTS 114, the intended receiver, node B 104, generates and sends out the CTS signal 116.
4. After node A 102 receives CTS 116, node A 102 generates and transmits the data transmission signal 118, which is received and recovered by node B 104. Node B 104 generates and transmits the ACK signal 120 which is received and recovered by node A 102.
5. Both RTS signal 114 and CTS signal 116 include information indicating the length of time intervals for the transmission to complete. Each of the devices which overheard the RTS or CTS messages and are not part of the communications link (node C 106 and node D 108) remain silent during the time interval communicated in the RTS signal 114 and CTS 116 signal, denoted as NAV period 122. This protocol is usually referred to as the virtual carrier sensing.
6. Now, at the next determined time interval, DIFS 124, each of the nodes (102, 104, 106, 108) senses ongoing transmissions.
7. After DIFS is completed, each of the nodes (102, 104, 106, 108) picks a random collision window (CW). In this example, consider that either (i) both node A 102 and node C 106 would like to send out RTS signals; however, consider that node C's CW is now shorter than node A's CW or (ii) node C 106 would like to send out an RTS signal, but node A does not desire to send out an RTS signal at this time. Therefore when the node C's CW 124 ends, node C 106 generates and sends out a RTS 126. At this time node A 102 is still sensing in its CW and detects energy above a predetermined sense level, and is precluded from transmitting an RTS if it wants to.
8. After receiving RTS 126, the intended receiver, node D 108, generates and sends out the CTS signal 128.
9. After node C 106 receives CTS 128, node C 106 generates and transmits the data transmission signal 130, which is received and recovered by node D 108. Node D 108 generates and transmits the ACK signal 132 which is received and recovered by node C 106.
10. Both RTS signal 126 and CTS signal 128 includes information indicating the length of time intervals for the transmission to complete. Each of the devices which overheard the RTS or CTS messages and are not part of the communications link (node A 102 and node B 104) remain silent during the time interval communicated in the RTS signal 126 and CTS 128 signal, denoted as NAV period 134.

Note in the current 802.11 protocol, each of the 802.11 protocol signals (114, 116, 118, 120, 126, 128, 130, 132) are transmitted at a predetermined, e.g., maximum, transmit power level. Also note that short InterFrame Spaces (SIFS) occur between the RTS and CTS, CTS and DATA, and DATA and ACK signals.

Current 802.11 PHY/MAC is not tailored for optimizing spatial reuse in large scale ad hoc network deployments. In particular, the carrier sensing protocol prevents two links from transmitting simultaneously whenever the two transmitters are within each other's carrier sensing range. This leads to overly conservative spatial reuse since if the two links are short links, they may be able to transmit simultaneously without causing too much damage to each other, if they were allowed to do so. Current carrier sensing based protocols, including RTS/CTS based yielding protocols, are based on a static energy threshold.

In view of the above discussion, it should be appreciated that there is a need for improved methods which would increase the chances for multiple devices to transmit at the same time when such transmissions do not prevent the device to which a signal is transmitted from recovering the transmitted signal.

SUMMARY

Various embodiments are directed to improved protocols, e.g., an enhanced 802.11 protocol, which enables SIR based yielding and/or improves spatial reuse as compared to current 802.11 based networks. Various methods and apparatus enable multiple devices using an 802.11 based protocol to communicate, e.g., transmit, during the same time interval. In various embodiments, the methods and apparatus use transmission timing constraints and/or Signal Interference Ratio (SIR) based yielding to avoid excessive interference between devices within communication range of each other.

In various embodiments a transmission decision and timing method is used where multiple different pairs of devices within communication range of each other, may proceed with communications during the same transmission time period, e.g., data traffic time period. The methods and apparatus are well suited for use in a system which uses 802.11 type signaling but are not limited to 802.11 systems. In accordance with various embodiments, a device corresponding to a second pair of devices, receiving an RTS (Request to Send) and a CTS (Clear to Send) corresponding to a first pair of devices, may proceed with communication, including RTS and CTS signaling, even though the same data transmission time period is being used by the first pair of devices. The decision by the second pair of devices to proceed with communication during the same time data communication time period as the first pair of devices is based, in part, on estimates of the interference which will be caused to the first pair of devices. The duration of data communication, e.g., traffic, by the second pair of devices is restricted to being the same as or shorter than the data time interval used by the first pair of devices. The constraint on the time interval used by the second pair of devices is determined from information, e.g., NAV, time information obtained from at least one of an RTS and a CTS, transmitted by the transmitter and receiver devices in the first pair of devices, respectively. The timing constraint allows communication by the second pair of devices to occur in the time period used by the first pair of devices which transmitted the signals used to determine the possible effect of interference. Thus, the communication of data between the second pair of devices does not extend into a time period during which the interference considerations upon which the decision to proceed with the data transmission are no longer relevant because some other pair of devices, other than the first pair, may begin communicating. In some embodiments the transmission power level of a CTS signal is a function, i.e., inversely proportional, to the received power level of the corresponding RTS signal. Based on the strength of the CTS signal, the transmitter device in the second pair of devices may perform a transmitter yielding operation. Based on the received strength of the RTS signal corresponding to the first transmitter device in relation to the received strength of the RTS signal corresponding to the second transmitter device, an SIR can be generated; and the receiving device in the second pair of devices makes a decision whether or not to transmit the CTS signal. Thus, in some but not necessarily all embodiments, the transmitting device in the second pair of devices will perform a transmitter yielding decision, and the receiver device in the second pair of devices will perform a receiver yielding decision.

An exemplary method of operating a wireless communication device, in accordance with some embodiments, comprises: receiving at least one of: i) a first RTS (Request to Send) signal from a first transmitter seeking to communicate with a first receiver or ii) a first CTS (Clear to Send) signal from said first receiver; determining from one of said first RTS signal and said first CTS signal a first transmission time period; determining a second transmission time period from the determined first transmission time period; and transmitting a second RTS to a second receiver, said second RTS including information indicating said second transmission time period. An exemplary wireless communications device, in accordance with some embodiments, comprises: at least one processor configured to: receive at least one of: i) a first RTS (Request to Send) signal from a first transmitter seeking to communicate with a first receiver or i) a first CTS (Clear to Send) signal from said first receiver; determine from one of said first RTS signal and said first CTS signal a first transmission time period; determine a second transmission time period from the determined first transmission time period; and transmit a second RTS to a second receiver, said second RTS including information indicating said second transmission time period. The exemplary wireless communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
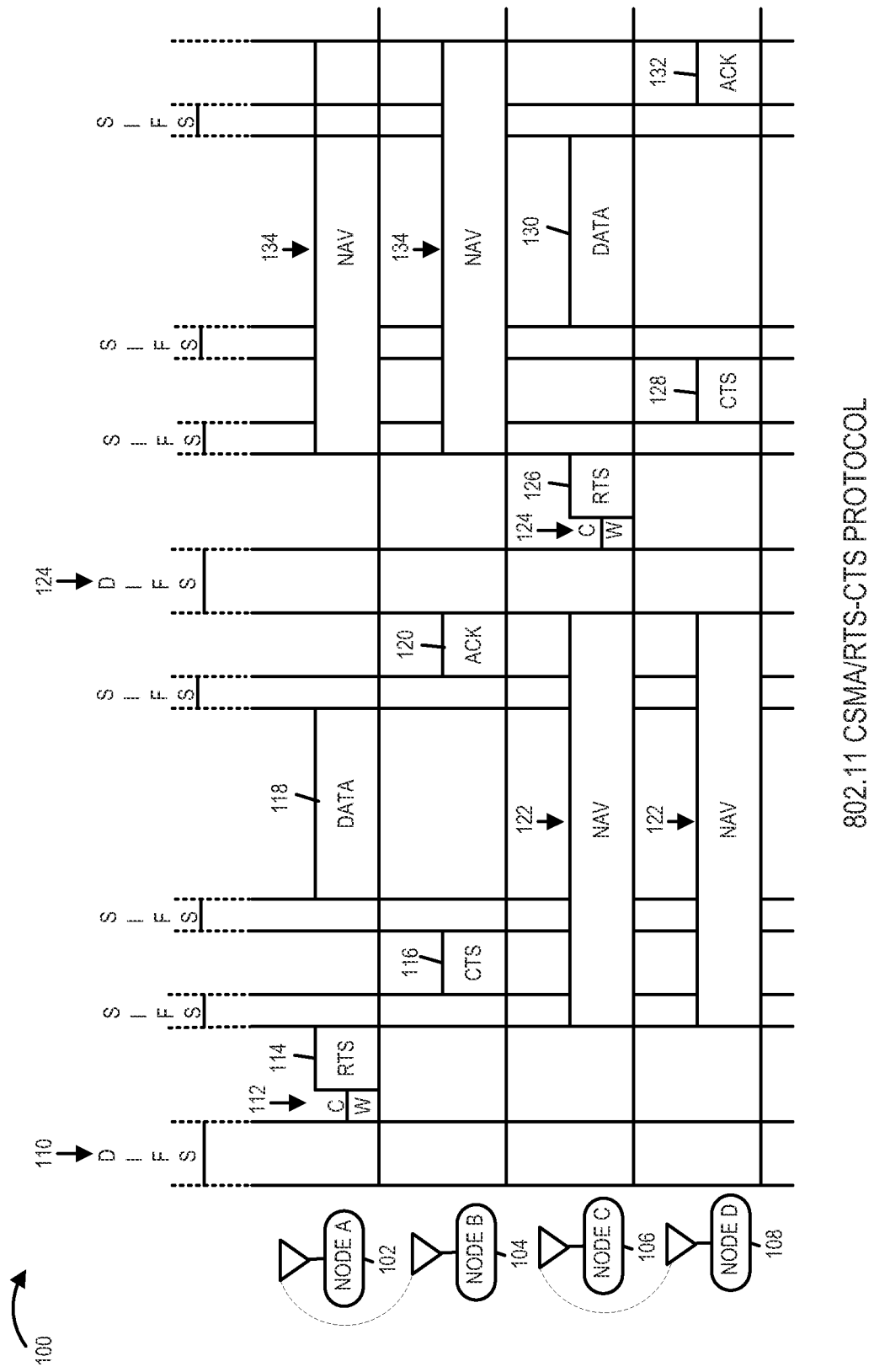
FIG. 1 illustrates a typical time line of events under the CSMA/RTS-CTS 802.11 protocol when two links compete for medium access.
Figure 2:
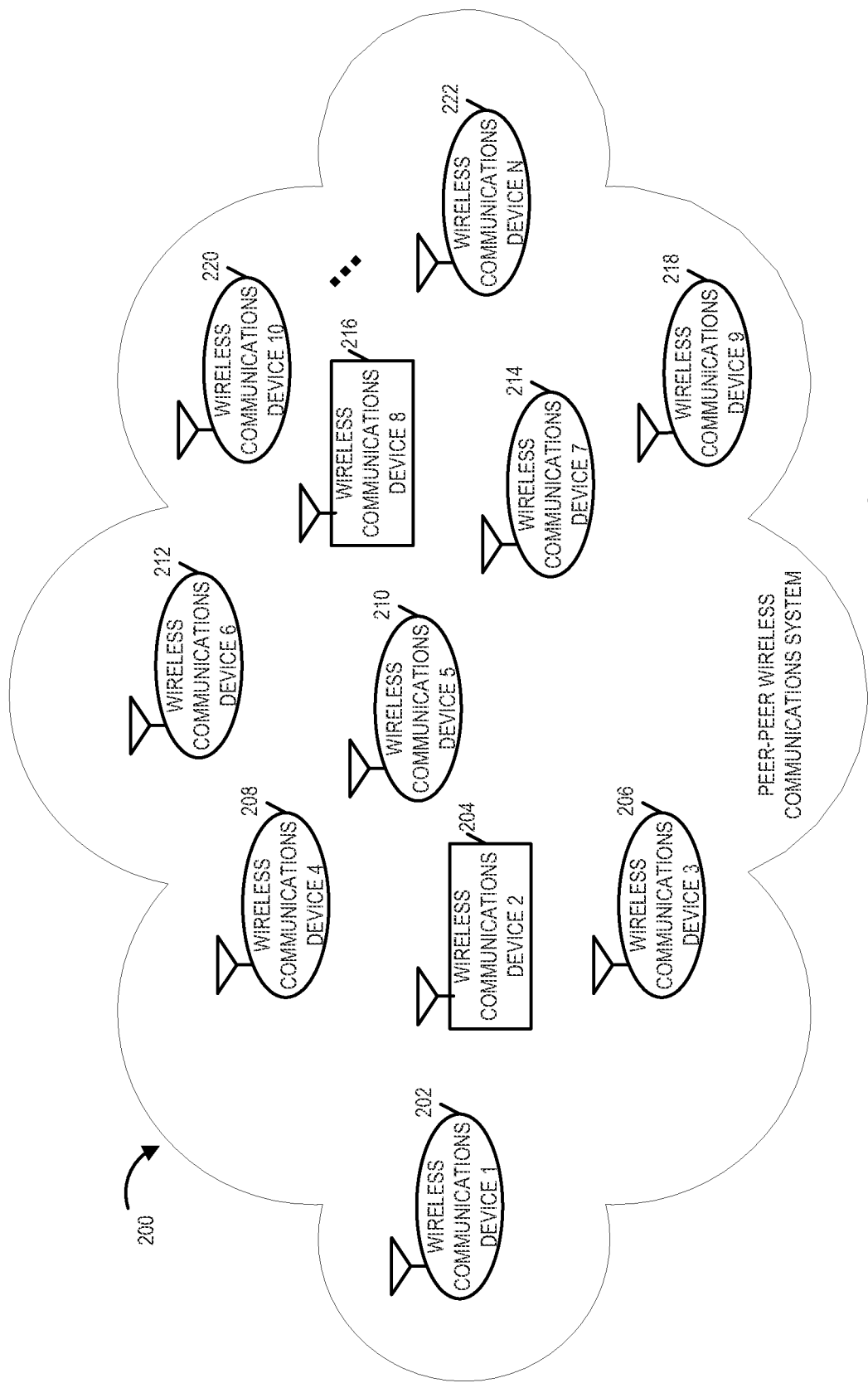
FIG. 2 is a drawing of an exemplary peer to peer wireless communications system in accordance with various exemplary embodiments.

FIG. 2 is a drawing of an exemplary peer to peer wireless communications system 200 in accordance with various exemplary embodiments. Exemplary peer to peer wireless communications system 200 includes a plurality of wireless communications devices (wireless communications device 1 202, wireless communications device 2 204, wireless communications device 3 206, wireless communications device 4 208, wireless communications device 5 210, wireless communications device 6 212, wireless communications device 7 214, wireless communications device 8 216, wireless communications device 9 218, wireless communications device 10 220, . . . , wireless communications device N 222) which support a peer to peer signaling protocol. Exemplary wireless communications devices (202, 206, 208, 210, 212, 214, 218, 220, 222) are mobile devices while wireless communications devices (204, 216) are stationary devices.

In exemplary system 200 an SIR based yielding protocol is implemented to improve spatial reuse over currently implemented approaches using a CSMA/RTS-CTS protocol. In exemplary system 200 multiple devices corresponding to different links use an 802.11 based protocol including SIR based yielding considerations to communicate, e.g., transmit, during the same time interval. In various embodiments, the methods and apparatus implemented by the wireless communications devices in system 200 use transmission timing constraints and/or Signal Interference Ratio (SIR) based yielding to avoid excessive interference between devices within communication range of each other.

Figure 3A:
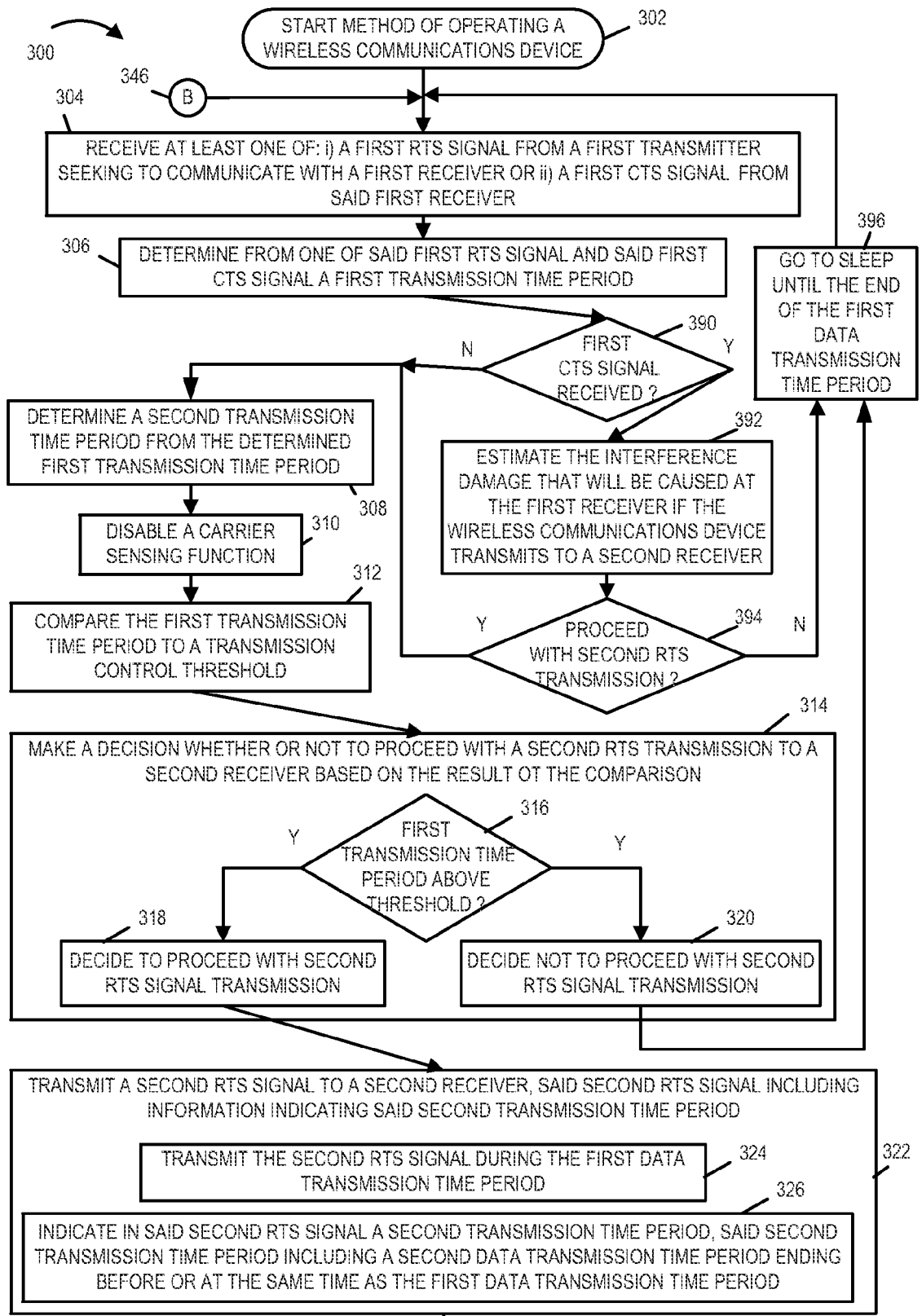
FIG. 3A is a first part of flowchart of an exemplary method of operating a wireless communications device in accordance with various embodiments.
Figures 3, 3A, 3B:
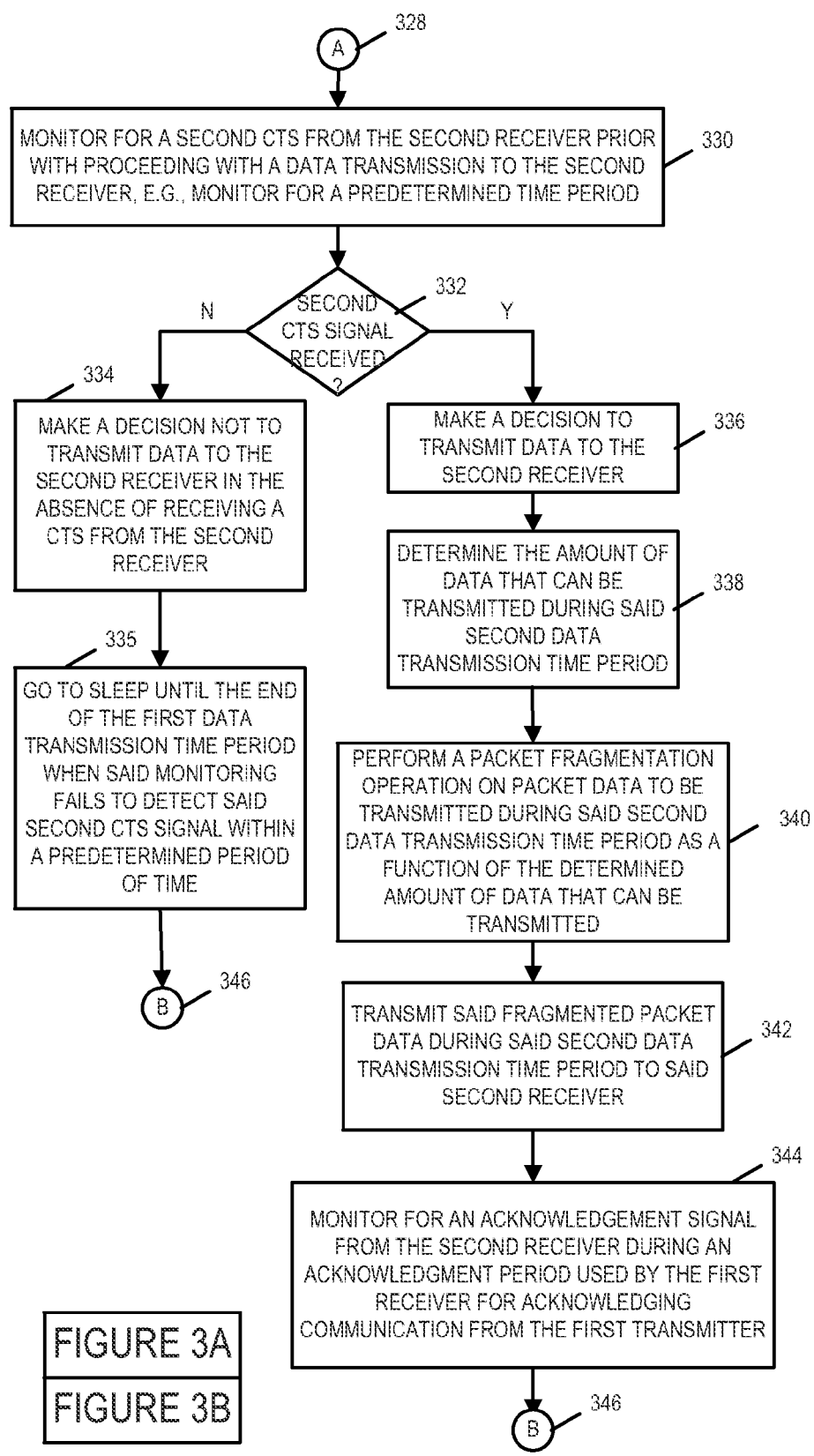
FIG. 3B is a second part of flowchart of an exemplary method of operating a wireless communications device in accordance with various embodiments.

FIG. 3, comprising the combination of FIG. 3A and FIG. 3B, is a flowchart 300 of an exemplary method of operating a wireless communications device in accordance with various embodiments. Operation starts in step 302 where the wireless communications device is powered on and initialized. Operation proceeds from start step 302 to step 304. In step 304 the wireless communications device receives at least one of: i) a first RTS signal from a first transmitter seeking to communicate with a first receiver or ii) a first CTS signal from said first receiver. In some embodiments, the power level of the received first RTS signal and/or the poser level of the received first CTS signal is also measured in step 304. Operation proceeds from step 304 to step 306.

In step 306 the wireless communications device determines, from one of said first RTS signal and said first CTS signal a first transmission time period. In various embodiments, the first transmission time period includes a first data transmission time period. In some embodiments, the first transmission time period is indicated by a duration field included in one of the first RTS signal and the first CTS signal.

Operation proceeds from step 306 to step 390. In step 390 the wireless communications device determines if it has received the first CTS signal. If it has not received the first CTS signal then operation proceeds from step 390 to step 308. However, if the wireless communications device has received the first CTS signal, then operation proceeds from step 390 to step 392. In step 392 the wireless communications device estimates the interference damage that will be caused at the first receiver if the wireless communications device transmits to a second receiver concurrently using the same air link resource, e.g., same time/frequency resource, while the first transmitter is transmitting data to the first receiver. In some embodiments, the estimation of step 392 is based on the received power level of the first CTS signal. Operation proceeds from step 392 to step 394. In step 394 the wireless communications device makes a decision whether or not to proceed with a second RTS transmission based on the interference estimate of step 392. Thus in step 394 the wireless communications device is making a transmitter yielding decision based on an estimate of damage that it will cause to reception at the first receiver. In some embodiments, in step 394 the wireless communications device compares the estimate of step 392 to a predetermined transmitter yielding threshold level. If in step 394 the wireless communications device decides not to proceed with the second RTS transmission, indicating transmitter yielding, then operation proceeds from step 394 to step 396. In step 396 the wireless communications device goes to sleep until the end of the first data transmission time period. Operation proceeds from step 396 to step 304. Returning to step 394, if in step 394, the wireless communications device decides to proceed with the second RTS transmission then operation proceeds from step 394 to step 308.

In step 308 the wireless communications device determines a second transmission time period from the first determined transmission time period. In various embodiments, the second transmission time period ends at or before the first transmission time period. Operation proceeds from step 308 to step 310. In step 310 the wireless communications device disables a carrier sensing function. By disabling the carrier sensing function the wireless communications device is able to send a second RTS signal at a later point if it should decide to. In the current 802.11 implementation, normal carrier sensing would prevent sending due to RTS signal power. Operation proceeds from step 310 to step 312.

In step 312 the wireless communications device compares the first transmission time period to a transmission control threshold. Then, in step 314 the wireless communications device makes a decision whether or not to proceed with a second RTS transmission to a second receiver based on the result of the comparison. In some embodiments, the wireless communications device proceeds with the second RTS only if the first transmission time period is above a threshold indicating that it is long enough to be useful, e.g., includes enough time to communicate a second RTS, a second CTS, and a second data interval, where the second data interval is at least as long as a second data interval predetermined time. Step 314 includes steps 316, 318, 320. In step 316 the wireless communications device uses the results from the comparison of step 312 to control operation. In step 316, if the comparison of step 312 indicates that the first transmission time period is above a threshold, then operation proceeds from step 316 to step 318, where the wireless communications device decides to proceed with the second RTS signal transmission. Operation proceeds from step 318 to step 322. Returning to step 316, if the comparison of step 312 indicates that the first transmission time period is not above the threshold, then operation proceeds from step 316 to step 320. In step 320 the wireless communications device decides not to proceed with second RTS signal transmission. Operation proceeds from step 320 to step 396, where the wireless communications device goes to sleep until the end of the first data transmission time period. Operation proceeds from step 396 to step 304.

Returning to step 322, in step 322 the wireless communications device transmits a second RTS signal to a second receiver, said second RTS signal including information indicating said second transmission time period. Step 322 includes steps 324 and 326. In step 324, the wireless communications device transmits the second RTS signal during the first data transmission time period, and in step 326 the wireless communications device indicates in said second RTS signal a second transmission time period, said second transmission time period including a second data transmission time period ending before or at the same time as the first data transmission time period. In some embodiments, the second transmission time period is communicated by a value in said second RTS signal. In various embodiments, step 324 and 326 are performed jointly. Operation proceeds from step 322, via connecting node A 328, to step 330.

In step 330 the wireless communications device monitors for a second CTS signal from the second receiver prior to proceeding with a data transmission to the second receiver. In some embodiments, the monitoring of step 330 is for a predetermined time period. Operation proceeds from step 330 to step 332. In step 332, if the second CTS signal was not received during the monitoring of step 330, then operation proceeds from step 332 to step 334, where the wireless communications device makes a decision not to transmit data to the second receiver in the absence of receiving a CTS from the second receiver. Then, in step 335 the wireless communications device goes to sleep until the end of said first data transmission time period when said monitoring fails to detect said second CTS signal within a predetermined period of time. Operation proceeds from step 335, via connecting node B 346 to step 304.

Returning to step 332, in step 332 if the second CTS signal was received during the monitoring of step 330, then operation proceeds from step 332 to step 336. In step 336 the wireless communications device makes a decision to transmit data to the second receiver. Operation proceeds from step 336 to step 338. In step 338 the wireless communications device determines the amount of data that can be transmitted during said second data transmission time period. Operation proceeds from step 338 to step 340. In step 340 the wireless communications device performs a packet fragmentation operation on packet data to be transmitted during the second data transmission time period as a function of the determined amount of data that can be transmitted. Note that in this exemplary implementation the constraint is time. This approach differs from a current 802.11 implementation in which a wireless communications device's data transmission time is based on the amount of data to be transmitted and the channel quality.

Operation proceeds from step 340 to step 342. In step 342 the wireless communications device transmits said fragmented packet data during said second data transmission time period to said second receiver. Operation proceeds from step 342 to step 344. In step 344 the wireless communications device monitors for an acknowledgment signal from the second receiver during an acknowledgement period used by the first receiver for acknowledging communications from the first transmitter. Thus, in this exemplary embodiment, the acks are time aligned corresponding to the different links, e.g., the ack corresponding to the data transmitted by the first transmitter to the first receiver during the first data transmission time interval is time aligned with the ack corresponding to the data transmitted by the wireless communications device to the second receiver during the second data transmission time interval. Operation proceeds from step 344, via connecting node B 346 to step 304.

Figure 4:
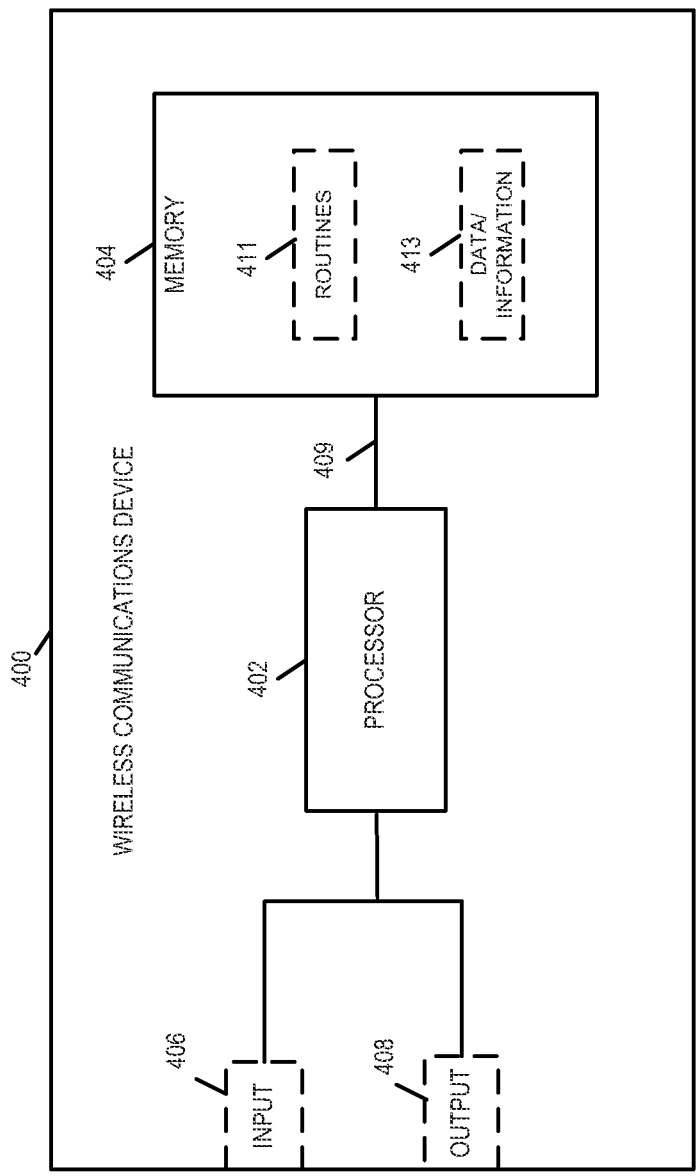
FIG. 4 is a drawing of an exemplary wireless communications device in accordance with an exemplary embodiment.

FIG. 4 is a drawing of an exemplary wireless communications device 400 in accordance with an exemplary embodiment. Exemplary wireless communications device 400 is, e.g., one of the wireless communications devices of system 200 of FIG. 2. Exemplary wireless communications device 400 may, and sometimes does, implement a method in accordance with flowchart 300 of FIG. 3.

Wireless communications device 400 includes a processor 402 and memory 404 coupled together via a bus 409 over which the various elements (402, 404) may interchange data and information. Wireless device 400 further includes an input module 406 and an output module 408 which may be coupled to processor 402 as shown. However, in some embodiments, the input module 406 and output module 408 are located internal to the processor 402. Input module 406 can receive input signals. Input module 406 can, and in some embodiments does, include a wireless receiver and/or a wired or optical input interface for receiving input. Output module 408 may include, and in some embodiments does include, a wireless transmitter and/or a wired or optical output interface for transmitting output. In some embodiments, memory 404 includes routines 411 and data/information 413.

In various embodiments, processor 402 is configured to receive at least one of: i) a first RTS (Request to Send) signal from a first transmitter seeking to communicate with a first receiver or ii) a first CTS (Clear to Send) signal from said first receiver; determine from one of said first RTS signal and said first CTS signal a first transmission time period; determine a second transmission time period from the determined first transmission time period; and transmit a second RTS to a second receiver, said second RTS including information indicating said second transmission time period; and memory coupled to said at least one processor. In various embodiments, said second transmission time period ends at or before the first transmission time period ends. In some embodiments, processor 402 is further configured to disable a carrier sensing function prior to proceeding with transmitting said second RTS.

In some embodiments, processor 402 is further configured to: compare said first transmission time period to a transmission control threshold, prior to transmitting the second RTS signal; and make a decision whether or not to proceed with said second RTS transmission based on the result of said comparison.

In some embodiments, said first transmission time period includes a first data transmission period; and processor 402 is further configured to transmit the second RTS signal during the first data transmission time period, as part of being configured to transmit said second RTS signal.

In various embodiments, processor 402 is further configured to monitor for a second CTS from the second receiver prior to proceeding with a data transmission to the second receiver. In some such embodiments, processor 402 is further configured to: make a decision not to transmit data to the second receiver in the absence of receiving a CTS from the second receiver.

In various embodiments, processor 402 is configured to monitor for an acknowledgment signal from the second receiver during an acknowledgement time period used by the first receiver for acknowledging communication from the first transmitter.

Processor 402, in some embodiments, is further configured to indicate in said second RTS signal a second transmission time period, said second transmission time period including a second data transmission time period ending before or at the same time as said first data transmission time period. In some such embodiments, processor 402 is configured to communicate said second transmission time period by a value in said second RTS signal.

In various embodiments, processor 402 is further configured to: determine the amount of data that can be transmitted during said second data transmission time period; and perform a packet fragmentation operation on packet data to be transmitted during said second data transmission time period as a function of said determined amount of data that can be transmitted.

In some embodiments, processor 402 is further configured to control the wireless communications device to go to sleep until the end of said first data transmission time period when said monitoring fails to detect said second CTS signal within a predetermined period of time.

In some embodiments, the second receiver receiving said second RTS transmits said second CTS only when an SIR generated from the first and second RTS signals received at the second receiver is above a predetermined threshold.

In some embodiments, said first transmission period of time is indicated by a duration field included in one of said first RTS and said first CTS signals, and processor 304 is configured to recover the first indicated first period of time from the duration field in the received first RTS or first CTS signal.

Figures 5, 5A:
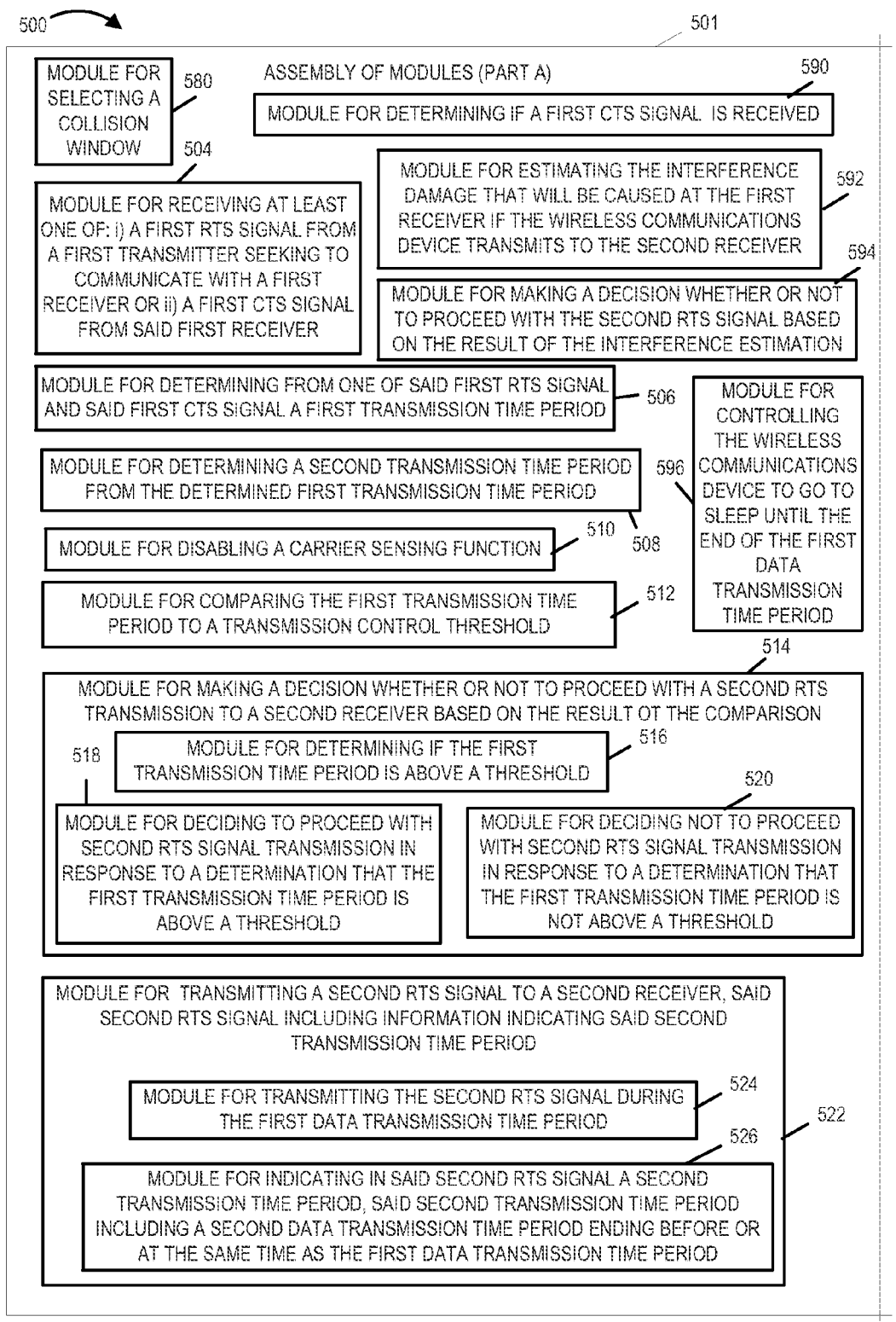
FIG. 5A is a first portion of an assembly of modules which can, and in some embodiments is, used in the exemplary wireless communications device illustrated in FIG. 4.
Figure 5B:
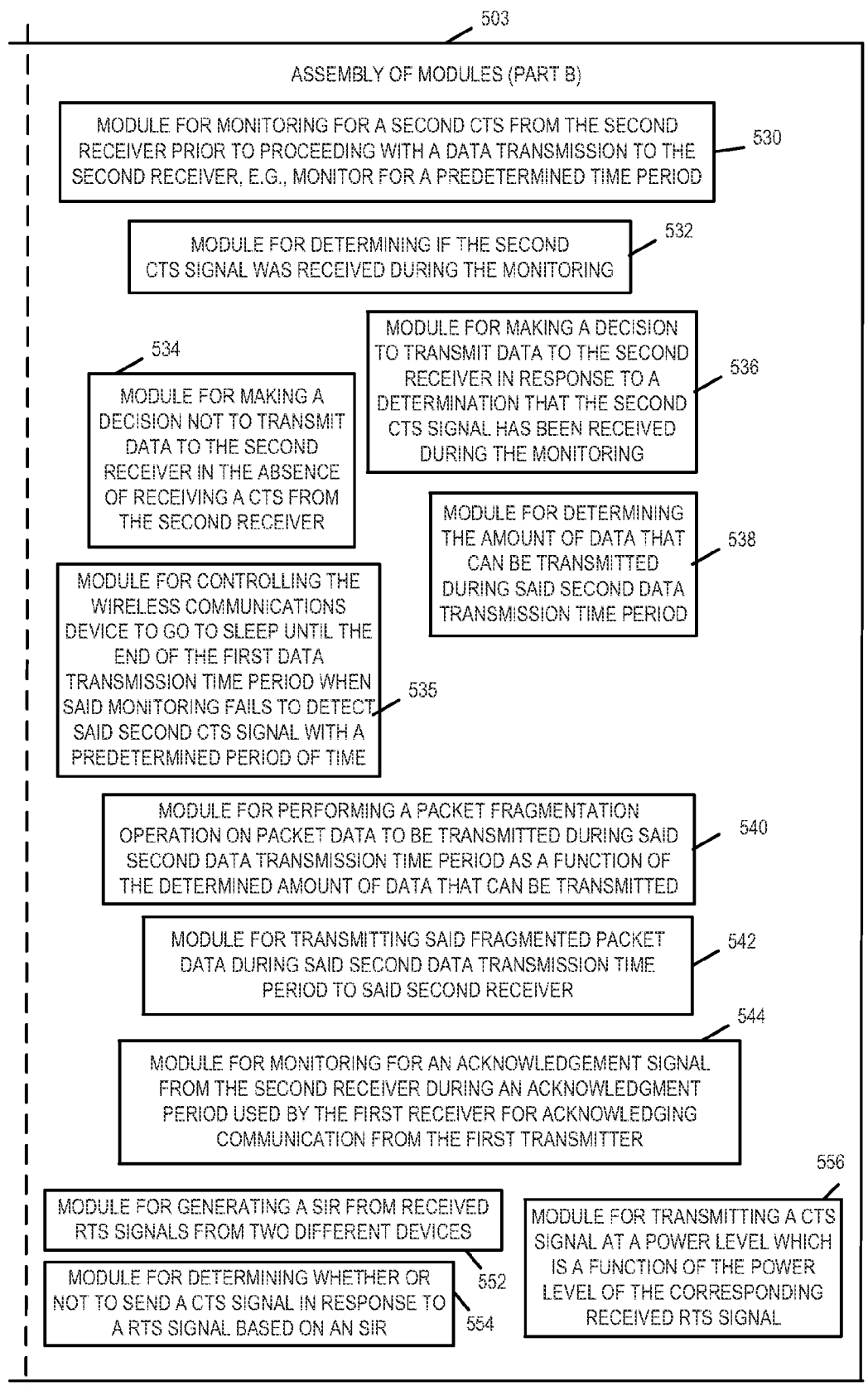
FIG. 5B is a second portion of an assembly of modules which can, and in some embodiments is, used in the exemplary wireless communications device illustrated in FIG. 4.

FIG. 5, comprising the combination of part A 501 of FIG. 5A and part B 503 of FIG. 5B, is an assembly of modules 500 which can, and in some embodiments is, used in the exemplary wireless communications device 400 illustrated in FIG. 4. The modules in the assembly 400 can be implemented in hardware within the processor 402 of FIG. 4, e.g., as individual circuits. Alternatively, the modules may be implemented in software and stored in the memory 404 of wireless communications device 400 shown in FIG. 4. In some such embodiments, the assembly of modules 500 is included in routines 411 of memory 404 of device 400 of FIG. 4. While shown in the FIG. 4 embodiment as a single processor, e.g., computer, it should be appreciated that the processor 402 may be implemented as one or more processors, e.g., computers. When implemented in software the modules include code, which when executed by the processor, configure the processor, e.g., computer, 402 to implement the function corresponding to the module. In some embodiments, processor 402 is configured to implement each of the modules of the assembly of modules 500. In embodiments where the assembly of modules 500 is stored in the memory 404, the memory 404 is a computer program product comprising a computer readable medium, e.g., a non-transitory computer readable medium, comprising code, e.g., individual code for each module, for causing at least one computer, e.g., processor 402, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 5 control and/or configure the wireless communications device 400 or elements therein such as the processor 402, to perform the functions of the corresponding steps illustrated and/or described in the method of flowchart 300 of FIG. 3.

Assembly of modules 500 includes part A 501 and part B 503. Assembly of modules 500 includes a module 504 for receiving at least one of: i) a first RTS signal from a first transmitter seeking to communicate with a first receiver or ii) a first CTS signal from said first receiver, a module 506 for determining from one of said first RTS signal and said first CTS signal a first transmission time period, a module 508 for determining a second transmission time period from the determined first transmission time period, a module 510 for disabling a carrier sensing function, and a module 512 for comparing the first transmission time period to a transmission control threshold. Assembly of modules 500 further includes a module 514 for making a decision whether or not to proceed with a second RTS transmission to a second receiver based on the result of the comparison, and a module 522 for transmitting a second RTS signal to a second receiver, said second RTS signal including information indicating said second transmission time period. Assembly of modules 514 includes a module 516 for determining if the first transmission time period is above a threshold, a module 518 for deciding to proceed with second RTS signal transmission in response to a determination that the first transmission time period is above a threshold, and a module 520 for deciding not to proceed with the second RTS signal transmission in response to a determination that the first transmission time period is not above a threshold. Module 522 includes a module 524 for transmitting the second RTS signal during the first data transmission time period and a module 526 for indicating in said second RTS signal a second transmission time period, said second transmission time period including a second data transmission time period ending before or at the same time as the first data transmission time period.

Assembly of modules 500 further includes a module 530 for monitoring for a second CTS signal from the second receiver prior to proceeding with a data transmission to the second receiver, e.g., monitoring for a predetermined time, a module 532 for determining if the second CTS signal was received during the monitoring, a module 534 for making a decision not to transmit data to the second receiver in the absence of receiving a CTS signal from the second receiver, a module 535 for controlling the wireless communications device to go to sleep until the end of the first data transmission time period when said monitoring fails to detect said second CTS signal within a predetermined period of time, and a module 536 for making a decision to transmit data to the second receiver in response to a determination that the second CTS signal has been received during the monitoring. Assembly of modules 500 further includes a module 538 for determining the amount of data that can be transmitted during the second data transmission time period, a module 540 for performing a packet fragmentation operation on packet data to be transmitted during said second data transmission time period as a function of the determined amount of data that can be transmitted, a module 542 for transmitting said fragmented packet data during said second data transmission time period to said second receiver, and a module 544 for monitoring for an acknowledgement signal during an acknowledgment period used by the first receiver for acknowledging communication from the first transmitter.

Assembly of modules 500 further includes a module 552 for generating a SIR from received RTS signal from two different devices, a module 554 for determining whether or not to send a CTS signal in response to a RTS signal based on an SIR, and a module 556 for transmitting a CTS signal at a power level which is a function of the power level of the corresponding received RTS signal. Modules 552, 554 and 556 pertain to operations in which the wireless communications device including assembly of modules 500 is operating as a receiver device. One of the RTS signals used in generating the SIR by module 552 is from a transmitter device which would like to transmit data to the wireless communications device including assembly of modules 500 and the other RTS signal is from a transmitter device which would like to transmit data to a different wireless communications device and represents potential interference to the wireless communications device including assembly of modules 500. Module 554 uses the result of module 554 to make a receiver yielding decision. If the wireless communications device including assembly of modules 500 decides to receiver yield, then module 554 determines not to send a CTS signal. However, if module 554 decides not to perform receiver yielding, then module 556 transmits a CTS signal in response to the RTS signal which was directed to it. In some embodiments, the transmission power level of a CTS signal is inversely proportional to the receive power level of the corresponding RTS signal which it is responding to. Transmitting CTS signals at a power level which is a function of the received power level of RTS signals, e.g. inversely proportional, facilitates transmitter yielding decisions by transmitter devices.

Assembly of modules 500 further includes a module 580 for selecting a collision window. In some embodiments, the collision window duration is selected pseudo-randomly, with the wireless communications device having different collision window lengths at different times. In various embodiments, the wireless communications device which has selected the shorter duration collision window has the higher priority for transmission among two wireless communications devices in a local vicinity competing to transmit data, e.g., the one with the shorter duration collision window is able to transmit its RTS signal first.

Assembly of modules 500 further includes a module 590 for determining if a first CTS signal is received, a module 592 for estimating the interference damage that will be caused at the first receiver if the wireless communications device including assembly of modules 500 transmits to the second receiver concurrently with the first transmitter transmitting data to the first receiver using the same air link resource, e.g., same time/frequency resource, and a module 594 for making a decision whether or not to proceed with the second RTS signal based on the result of the interference measurement, e.g., the result of the estimation from module 592. Thus module 594 makes a transmitter yielding decision; if module 594 decides that it will perform transmitter yielding module 594 decides not to transmit the second RTS signal. In some embodiments, the estimation of module 592 is based on the received power level of first CTS signal. In some embodiments, CTS signals are transmitted at a power level which is a function of the received power level of a corresponding RTS signal. In some such embodiments, there is an inverse proportional relationship which facilitates interference determination measurements. Assembly of modules 500 further includes a module 596 for controlling the wireless communications device to go to sleep until the end of the first data transmission time period, e.g., in response to a decision not to transmit a second RTS signal, e.g., due to a transmitter yielding decision based on an interference damage cost estimate and/or based on an available transmission time not being above a threshold.

Figure 6:
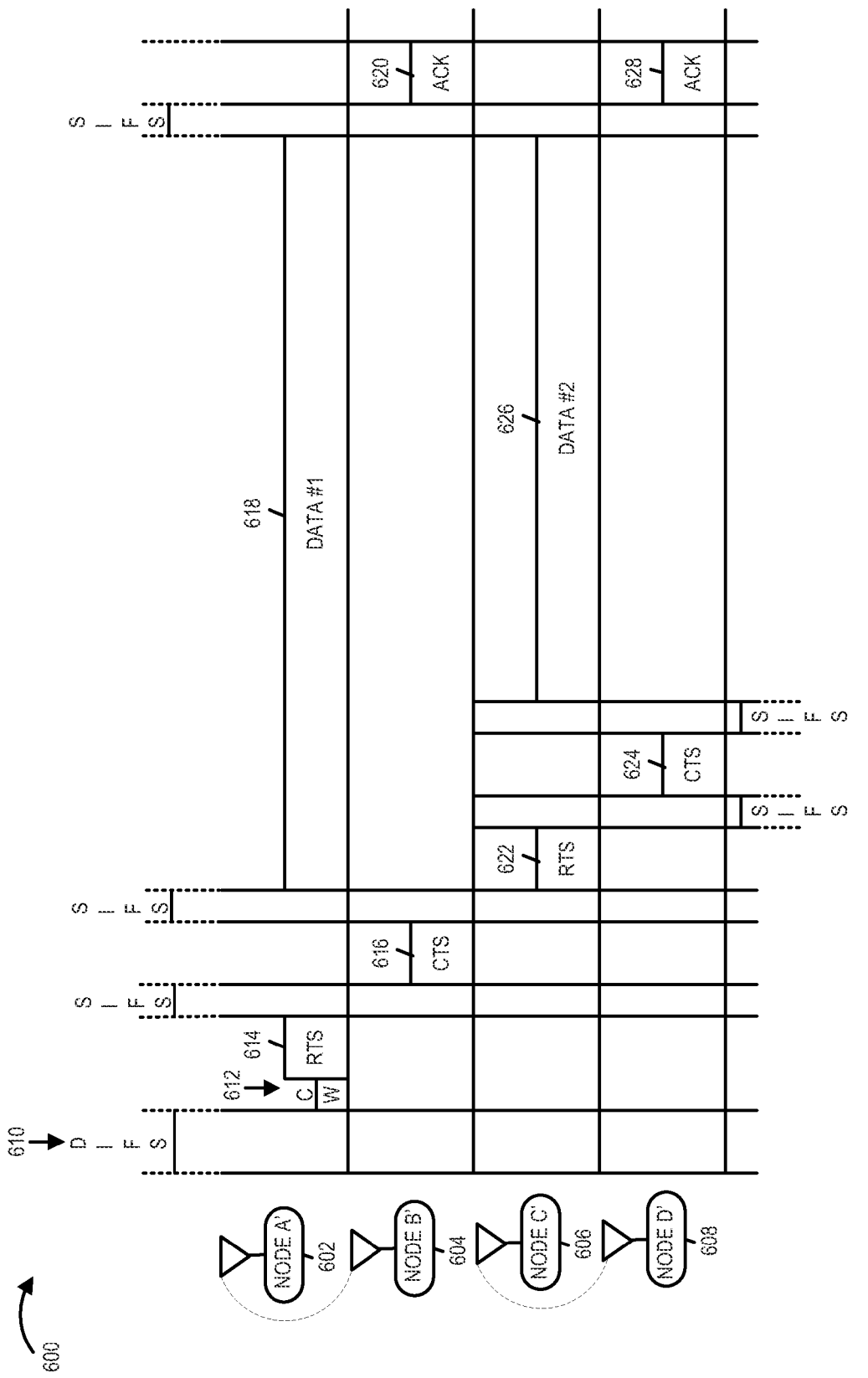
FIG. 6 is drawing illustrating an exemplary new 802.11 based protocol which facilitates concurrent transmission of data by two devices using the same air link resource.

FIG. 6 is drawing 600 illustrating an exemplary new 802.11 based protocol which facilitates concurrent transmission of data by two devices using the same air link resource. FIG. 6 illustrates an exemplary time line of events under the exemplary new 802.11 based protocol when two links compete for medium access. In this example node A' 602 and node C' 606 are the two transmitters with intended receivers being node B' 604 and node D' 608, respectively. The nodes (602, 604, 606, 608) are, e.g., any of the wireless communications devices of system 200 of FIG. 2. Node C' 606 is, e.g., wireless communications device 400 of FIG. 4 which is implementing a method in accordance with flowchart 300 of FIG. 3. In some such embodiments, node A' 602 is the first transmitter described in the flowchart 300 of FIG. 3; node B' 604 is the first receiver described in the flowchart 300 of FIG. 3; and node D' 608 is the second receiver described in the flowchart 300 of FIG. 3. Various elements in this protocol are described example below.

1. Each of the nodes (602, 604, 606, 608) waits for a determined time interval DIFS 610 to sense ongoing transmissions.
2. After DIFS 610 is completed, each of the nodes (602, 604, 606, 608) picks a random collision window (CW). A node is not allowed to send out an RTS signal during its CW window. During CW, the node keeps carrier sensing and a node is allowed to send out an RTS subsequent to its CW window if the energy level sensed during its CW is below a predetermined threshold. In this example, consider that both node A' 602 and node C' 606 would like to send out RTS signals; however, consider that node A' 602 has picked a CW which is shorter than the CW that node C' 606 has selected. Therefore when the node A' CW 612 ends, node A' 602 generates and sends out a RTS 614. At this time node C' 606 is still sensing in its CW and detects energy above a predetermined sense level, and is precluded from transmitting an RTS.
3. After receiving RTS 614, the intended receiver, node B' 604, generates and sends out CTS signal 616.
4. After node A' 602 receives CTS 616, node A' 602 generates and transmits the data transmission signal, DATA #1 618, which is received and recovered by node B' 604. Node B' 604 generates and transmits the ACK signal 620 which is received and recovered by node A' 602.
5. Both RTS signal 614 and CTS signal 616 includes information indicating the length of time intervals for the transmission to complete. When node C' 606 hears the RTS signal 614 before its CW window has expired, it keeps listening for the corresponding CTS signal 616. There are two possible scenarios: (a) the CTS is never sent, i.e. the intended receiver, node B' 604, for the RTS signal 614 yielded to some other transmission or simply is busy with something else; or (b) the CTS 616 is sent. In the example, of FIG. 6, the CTS signal 616 is sent. In the scenario (a), node C' 606 simply ignores the RTS 614 and starts transmitting its RTS signal 622 at the beginning when DATA #1 618 is supposed to start. Node C' 606 has this information since there is a known predetermined relationship between the start of the DATA #1 618 interval and the start of RTS signal 614. In scenario (b), node C' 606 evaluates how much damage it estimates that it will cause to the reception at node B' 604 of the data transmission from node A' 602, if node C' 606 should transmit concurrently using the same air link resource. In some embodiments, node C' 606 performs this estimation based on the measured received energy level of CTS signal 616 at node C' 606. It will make a decision whether or not it can go ahead with its own transmission by this measurement. If the energy of CTS is high, e.g., above a predetermined threshold, the transmitter will yield the transmission opportunity and go to sleep until the end of the first data transmission time interval. Otherwise, the transmitter will start transmitting its RTS signal 622 at the same slot when DATA #1 618 of the first transmission starts.
6. If node C' 606 receives a CTS 624 from its intended receiver node D' 608, node C' 606 will go ahead with the data transmission, DATA #2 626, which ends where the DATA #1 618 of the first transmission ends. Note node D' 608 might not send a CTS 624, either because the RTS 622 is not decodable due to the ongoing transmission between node A' and node B; or node D' 608 decodes the RTS 622 from node C' 606 successfully but decides to yield the transmission. This decision is SIR based by comparing the energy measured from both RTS signals (614, 622). This measurement shows the SIR the receiver node D' 608 gets if the transmission between node C' 606 and node D' 608 happens. Node D' 608 decides to yield the transmission opportunity, by not sending back CTS 624 if the SIR is poor, e.g., below a predetermined acceptable threshold level. On the other hand, if the CTS 624 is sent back, node D' 608 will receive the DATA #2 626 transmission and sends ACK 628 back at the same time of the ACK 620 of the first DATA #1 618 transmission between node A' 602 and node B' 604.

A few features used in some, but not necessarily all, embodiments will be further described. In some embodiments, to enable an SIR based decision at node C' 606 about whether to send a RTS signal 622, the transmit power of CTS signals (616, 624) is chosen in accordance with a predetermined scheme known to the wireless communications devices. In some embodiments, the transmit power of a CTS signal is a function of the receive power of the corresponding RTS signal at the device which is generating and transmitting the CTS signal. In some such embodiments, the transmit power of a CTS signal is inversely proportional to the received energy of the corresponding RTS signal. This can provide a faithful estimation of the SIR damage caused by the second transmission. In some embodiments, RTS signals (614, 622) are transmitted at the same power level, e.g. maximum transmit power. In some embodiments, RTS signals (614, 622) are transmitted at known power levels. In some embodiments, RTS signals (614, 622) are transmitted at power levels, which may be different, but can be determined from information communicated in the RTS signals. Therefore, SIR based on received signals (614, 622) can be determined.

It is desirable to protect the ongoing transmission DATA #1 618 sent by node A' 602 from RTS 622 and CTS 624 as well. In some embodiments, this is possible, since both node C' 606 and node D' 608 has got an estimation of the damage it can cause to node B' 604 by observing CTS signal 616 from node B' 606. Nodes C' 606 and D' 608 can yield from their RTS 622 transmission and CTS 624 transmission, respectively, if they sense the damage to DATA #1 618 would be unacceptably large, e.g., by comparing the energy from received CTS 616 to given yielding thresholds, respectively.

It is beneficial for DATA #2 626 to end at the same time as DATA #1 618. Otherwise, node A' 602 and node B' 604 have to wait until DATA #2 626 to be complete to wait for the next round of competition since then, it can decode the RTS/CTS signals rather than blindly yielding to unknown energy in carrier sensing. In some embodiments, DATA #2 626 transmission is controlled to end at the same time as the DATA #1 transmission 618 ends. In some embodiments, DATA #2 626 transmission is controlled to end at or before the time as DATA #1 618 transmission ends.

In various embodiments, the two ACK channels are intentionally controlled to happen simultaneously. It is advantageous that both ACKs (620, 628) go through with a high degree of certainty. In various embodiments, sufficient information is provided in the energy levels of the RTS (614, 622) and CTS (616, 624) signals and node B' 604 and node D' 608 can control the ACKs, e.g., at the transmission energy levels of the ACKs (620, 628) so they will not interfere with each other unacceptably, e.g., ACK 620 will be recoverable by node A' 602 and ACK 628 will be recoverable by node C' 606.

In some embodiments, another level of CW is introduced before the second RTS to let multiple devices compete for the DATA #2 transmission opportunity. For example, a node E', which wants to transmit data to a node F', may compete with the node C' which wants to transmit data to node D', and the one of node C' and E' which selects the smaller CW in the second round, e.g., the CW which ends first in the second round has the opportunity to potentially transmit in the DATA #2 slot, provided interference and time consideration are satisfied.

Figure 7:
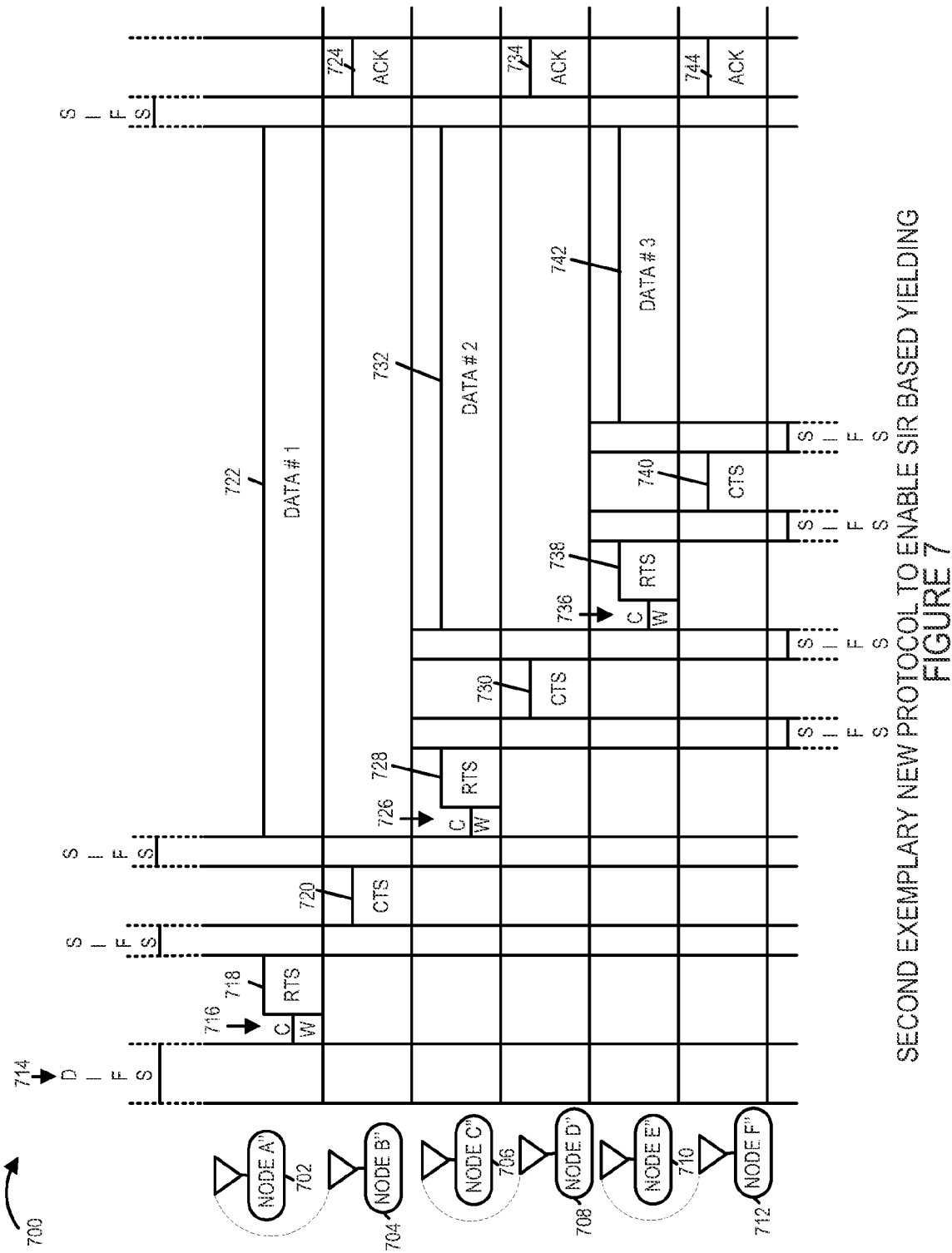
FIG. 7 is a drawing illustrating a second exemplary new 802.11 based protocol which facilitates concurrent transmission of data by more than two devices, e.g., three devices, using the same air link resource.

FIG. 7 is a drawing 700 illustrating a second exemplary new 802.11 based protocol which facilitates concurrent transmission of data by more than two devices, e.g., three devices, using the same air link resource. FIG. 7 illustrates an exemplary time line of events under the second exemplary new 802.11 based protocol when multiple links compete for medium access. In this example node A" 702, node C" 706, and node E" 710 are the transmitters with intended receivers being node B" 704, node D" 708, and node F" 712, respectively. The nodes (702, 704, 706, 708, 710, 712) are, e.g., any of the wireless communications devices of system 200 of FIG. 2. Node C" 706 is, e.g., wireless communications device 400 of FIG. 4 which is implementing a method in accordance with flowchart 300 of FIG. 3. Various elements in this protocol are described example below.

1. Each of the nodes (702, 704, 706, 708, 710, 712) waits for a determined time interval DIFS 714 to sense ongoing transmissions.
2. After DIFS 714 is completed, each of the nodes (702, 704, 706, 708, 710, 712) picks a random collision window (CW). A node is not allowed to send out an RTS signal during its CW window. During CW, the node keeps carrier sensing and a node is allowed to send out an RTS subsequent to its CW window if the energy level sensed during its CW is below a predetermined threshold. In this example, consider that node A" 702, node C" 706, and node E" 710 would like to send out RTS signals; however, consider that node A" 702 has picked a CW which is shorter than the CW that node C" 706 has selected and shorter than the CW that node E" 710.

Therefore when the node A" CW 716 ends, node A" 702 generates and sends out a RTS 718. At this time node C" 706 and node E" 710 are still sensing in their CWs and detects energy above a predetermined sense level, and are precluded from transmitting an RTS.

3. After receiving RTS 718, the intended receiver, node B" 704, generates and sends out CTS signal 720.
4. After node A" 702 receives CTS 720, node A" 702 generates and transmits the data transmission signal, DATA #1 722, which is received and recovered by node B" 704. Node B" 704 generates and transmits the ACK signal 724 which is received and recovered by node A" 702.
5. Both RTS signal 718 and CTS signal 720 includes information indicating the length of time intervals for the transmission to complete. When node C" 706 and node E" 710 hear the RTS signal 718 before their CW windows have expired, they keep listening for the corresponding CTS signal 720. In the example of FIG. 7 the CTS signal 720 is sent. Node C" 706 and node E" 710 compete for sending an RTS at the next opportunity, which is the start of DATA #1 722 transmission.
6. Nodes (706, 708, 710, 712) picks a random collision window (CW) at the start of DATA #1 722 transmission interval. In this example, consider that node C" 706, and node E" 710 would like to send out RTS signals; however, consider that node C" 706 has picked a CW which is shorter than the CW that node E" 710 has selected. Therefore when the node C" CW 726 ends, node C" 706 generates and sends out a RTS 728. At this time node E" 710 is still sensing in its CW and detects energy above a predetermined sense level, is therefore precluded from transmitting an RTS.
7. After receiving RTS 728, the intended receiver, node D" 708, generates and sends out CTS signal 730.
8. After node C" 706 receives CTS 730, node C" 706 generates and transmits the data transmission signal, DATA #2 732, which is received and recovered by node D" 708. Node D" 708 generates and transmits the ACK signal 734 which is received and recovered by node C" 706.
9. Both RTS signal 728 and CTS signal 730 includes information indicating the length of time intervals for the transmission to complete. When node E" 710 hears the RTS signal 728 before its CW window has expired, it keeps listening for the corresponding CTS signal 730. In the example, of the CTS signal 730 is sent. Node E" 710 can compete for sending an RTS at the next opportunity, which is the start of DATA #2 732 transmission.
10. Nodes (710, 712) pick a random collision window (CW) at the start of DATA #2 transmission interval. In this example, consider that node E" 710 would like to send out RTS signals. Consider that node E" 710 has picked a CW 736, and that node E" 710 wins the round, e.g., either by having the shortest CW or by being the only device that desires to transmit an RTS at this time. Therefore when the node E" CW 736 ends, node E" 710 generates and sends out a RTS 738.
11. After receiving RTS 738, the intended receiver, node F" 712, generates and sends out CTS signal 740.
12. After node E" 710 receives CTS 740, node E" 710 generates and transmits the data transmission signal, DATA #3 742, which is received and recovered by node F" 712. Node F" 712 generates and transmits the ACK signal 744 which is received and recovered by node E" 710.

In the example, of FIG. 7 transmitter yielding and receiver yielding is performed in a similar manner as described above in the example of FIG. 6. For example, node C'" 706 makes transmitter yielding decisions based on the expected interference that its transmission of DATA #2 732 is expected to cause to the reception of DATA #1 722 by node B" 704, e.g., using a measurement of received CTS signal 720. Node D" 708 makes receiver yielding decisions based on an SIR based on received RTS signals 718 and 728. Node E" 710 makes transmitter yielding decisions based on the interference that its transmission of DATA #3 742 is expected to cause to both the reception of DATA #1 722 by node B" 704 and the reception of DATA #2 732 by node D" 708, e.g., using measurements of received CTS signals (720, 730). Node F'" 712 makes receiver yielding decisions based on received RTS signals 718, 728 and 738.

In addition, to making decisions whether or not to proceed based on transmitter and receiver yielding considerations, e.g., estimated SIRs, the wireless communications devices make determinations whether or not to proceed with another round of RTS/CTS/DATA based on time consideration, e.g., whether or not the time interval including the DATA includes enough time for an RTS, CTS and DATA segment. In some embodiments, different devices may have different threshold limits for what is a minimum data transmission time interval to proceed with an RTS transmission. In some embodiments, the same device at different times may have different threshold limits for what is a minimum data transmission time interval to proceed with an RTS transmission.

In this approach of FIG. 7, it is possible for no data transmissions to occur in some rounds by a device which won the opportunity to transmit an RTS in that round, e.g., based on yielding consideration and/or timing consideration. For example, DATA #2 732 might not be transmitted if node C'" 706 or node D" 708 decides to yield, but DATA #1 722 and DATA #3 742 might still be transmitted.

Although the example, of FIG. 7 shows 3 concurrent DATA transmissions, in some embodiments, more than 3 concurrent data transmission are possible using this approach. In some embodiments, the number of potential concurrent data transmissions is limited by timing interval considerations, e.g. how much time is available for a new concurrent data transmission. In some embodiments, a new potential data transmission considers the interference damage to reception of already scheduled data transmission and the interference reception impact at its intended receiver from scheduled prior round transmissions.

Various methods and apparatus described in this application are well suited for use in wireless communications devices and networks supporting peer to peer signaling. In various embodiments a device of any of one or more of FIGS. 1-7 includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the wireless communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile wireless communications devices, e.g., mobile nodes such as mobile terminals, stationary wireless communications devices such as access points such as base stations, network nodes and/or communications systems. Various embodiments are also directed to methods, e.g., method of controlling and/or operating wireless communications devices such as mobile nodes and/or stationary nodes, access points such as base stations network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal reception, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device supporting peer to peer signaling, including a processor configured to implement one, multiple or all of the steps of one or more methods of the invention.

In some embodiments, the processor or processors, e.g., CPUs, of one or more devices, e.g., communications nodes such as wireless terminals, access nodes, and/or network nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless communication device comprising:
    receiving, at a second transmitter, at least one of:
        i) a first request to send signal from a first transmitter seeking to communicate with a first receiver or ii) a first clear to send signal from said first receiver;
        determining, by the second transmitter, from one of said first request to send signal and said first clear to send signal a first transmission time period;
        determining, by the second transmitter, a second transmission time period from the determined first transmission time period, the first transmitter transmitting to the first receiver during the first transmission time period;
        disabling a carrier sensing function prior to transmitting a second request to send signal; and
        transmitting, from the second transmitter, the second request to send signal to a second receiver during the first transmission time period, said second request to send signal including information indicating said second transmission time period.

2. The method of claim 1, further comprising:
    prior to transmitting the second request to send signal, comparing said first transmission time period to a transmission control threshold; and
    making a decision whether or not to proceed with said second request to send signal transmission based on the result of said comparison.

3. The method of claim 1, further comprising:
    wherein said first transmission time period includes a first data transmission period; and
    wherein transmitting said second request to send signal during the first transmission time period includes transmitting the second request to send signal during the first data transmission time period.

4. The method of claim 3, further comprising:
    monitoring for a second clear to send signal from the second receiver prior to proceeding with a data transmission to the second receiver.

5. The method of claim 3, further comprising:
    indicating in said second request to send signal a second transmission time period, said second transmission time period including a second data transmission time period ending before or at the same time as said first data transmission time period.

6. The method of claim 5, wherein said second transmission time period is communicated by a value in said second request to send signal.

7. The method of claim 5, further comprising:
    determining the amount of data that can be transmitted during said second data transmission time period; and
    performing a packet fragmentation operation on packet data to be transmitted during said second data transmission time period as a function of said determined amount of data that can be transmitted.

8. The method of claim 4, further comprising:
    going to sleep until the end of said first data transmission time period when said monitoring fails to detect said second clear to send signal within a predetermined period of time.

9. The method of claim 4, wherein the second receiver receiving said second request to send transmits said second clear to send only when a signal-to-interference ratio generated from the first and second request to send signals received at the second receiver is above a predetermined threshold.

10. A wireless communication device comprising:
    means for receiving, at a second transmitter, at least one of:
        i) a first request to send signal from a first transmitter seeking to communicate with a first receiver or ii) a first clear to send signal from said first receiver;
        means for determining, by the second transmitter, from one of said first request to send signal and said first clear to send signal a first transmission time period;
        means for determining, by the second transmitter, a second transmission time period from the determined first transmission time period, the first transmitter transmitting to the first receiver during the first transmission time period;
        means for disabling a carrier sensing function prior to transmitting a second request to send signal; and
        means for transmitting, from the second transmitter, the second request to send signal to a second receiver during the first transmission time period, said second request to send signal including information indicating said second transmission time period.

11. The wireless communications device of claim 10, further comprising:
means for comparing said first transmission time period to a transmission control threshold, prior to transmitting the second request to send signal; and
means for making a decision whether or not to proceed with said second request to send signal transmission based on the result of said comparison.

12. The wireless communications device of claim 10, wherein said first transmission time period includes a first data transmission period; and
wherein said means for transmitting said second request to send signal during the first transmission time period includes means for transmitting the second request to send signal during the first data transmission time period.

13. The wireless communications device of claim 12, further comprising:
means for monitoring for a second clear to send signal from the second receiver prior to proceeding with a data transmission to the second receiver.

14. The wireless communications device of claim 12, further comprising:
means for indicating in said second request to send signal a second transmission time period, said second transmission time period including a second data transmission time period ending before or at the same time as said first data transmission time period.

15. A computer program product for use in a wireless communications device, the computer program product comprising:
a non-transitory computer readable medium comprising:
code for causing at least one computer of a second transmitter to receive at least one of:
i) a first request to send signal from a first transmitter seeking to communicate with a first receiver or ii) a first clear to send signal from said first receiver;
code for causing said at least one computer of the second transmitter to determine from one of said first request to send signal and said first clear to send signal a first transmission time period;
code for causing said at least one computer of the second transmitter to determine a second transmission time period from the determined first transmission time period, the first transmitter transmitting to the first receiver during the first transmission time period;
code for causing said at least one computer of the second transmitter to disable a carrier sensing function prior to transmitting a second request to send signal; and
code for causing said at least one computer of the second transmitter to transmit the second request to send signal to a second receiver during the first transmission time period, said second request to send signal including information indicating said second transmission time period.

16. A wireless communications device comprising:
at least one processor configured to:
receive, at a second transmitter, at least one of:
i) a first request to send signal from a first transmitter seeking to communicate with a first receiver or ii) a first clear to send signal from said first receiver;
determine, by the second transmitter, from one of said first request to send signal and said first clear to send signal a first transmission time period;
determine, by the second transmitter, a second transmission time period from the determined first transmission time period, the first transmitter transmitting to the first receiver during the first transmission time period;
disable a carrier sensing function prior to transmitting a second request to send signal; and
transmit, from the second transmitter, the second request to send signal to a second receiver during the first transmission time period, said second request to send signal including information indicating said second transmission time period; and
memory coupled to said at least one processor.

17. The wireless communications device of claim 16, wherein said at least one processor is further configured to:
compare said first transmission time period to a transmission control threshold, prior to transmitting the second request to send signal; and
make a decision whether or not to proceed with said second request to send signal transmission based on the result of said comparison.

18. The wireless communications device of claim 16, wherein said first transmission time period includes a first data transmission, and wherein said at least one processor is further configured to transmit the second request to send signal during the first data transmission time period, as part of being configured to transmit said second request to send signal during the first transmission time period.

19. The wireless communications device of claim 18, wherein said at least one processor is further configured to:
monitor for a second clear to send signal from the second receiver prior to proceeding with a data transmission to the second receiver.

20. The wireless communications device of claim 18, wherein said at least one processor is further configured to:
indicate in said second request to send signal a second transmission time period, said second transmission time period including a second data transmission time period ending before or at the same time as said first data transmission time period.

* * * * *